(12) United States Patent
Wall

(10) Patent No.: US 8,622,690 B1
(45) Date of Patent: Jan. 7, 2014

(54) INTER-PROPELLANT THRUST SEAL

(75) Inventor: Andrew P Wall, Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 682 days.

(21) Appl. No.: 12/958,064

(22) Filed: Dec. 1, 2010

(51) Int. Cl.
*F01D 3/04* (2006.01)
(52) U.S. Cl.
USPC .......................................................... 415/105
(58) Field of Classification Search
USPC ........... 415/104, 105, 106, 107; 384/132, 134
See application file for complete search history.

(56) References Cited

U.S. PATENT DOCUMENTS

| 4,993,917 A | * | 2/1991 | Kulle et al. | 415/105 |
| 5,104,284 A | * | 4/1992 | Hustak et al. | 415/105 |

* cited by examiner

*Primary Examiner* — Dwayne J White
(74) *Attorney, Agent, or Firm* — John Ryznic

(57) ABSTRACT

An inter-propellant thrust seal for a rocket engine with purge fluid introduced into purge chambers to prevent mixing of reactive fluids located outside of bearings, and where one of the purge chambers is formed by an axial thrust piston on the rotor shaft so that the purge fluid in that chamber will also produce axial thrust on the rotor shaft.

5 Claims, 2 Drawing Sheets

INTER-PROPELLANT THRUST SEAL

GOVERNMENT LICENSE RIGHTS

None.

CROSS-REFERENCE TO RELATED APPLICATIONS

None.

BACKGROUND OF THE INVENTION

1. Field of the Invention

The present invention relates generally to rocket engine turbopumps, and more specifically to an inter-propellant thrust seal.

2. Description of the Related Art Including Information Disclosed Under 37 CFR 1.97 and 1.98

In a rocket engine, a turbopump drives two pumps on a common rotor shaft with one pump for a liquid fuel and the second pump for a liquid oxidizer. Such fuel and oxidizer—such as liquid hydrogen and liquid oxygen—are combustible when mixed together. Thus, inter-propellant seals are used to purge seals that separate the fuel from the oxidizer. A thrust seal is also required to balance out loads that form on the rotor shaft from blades or other fluid reaction surfaces.

BRIEF SUMMARY OF THE INVENTION

An inter-propellant thrust seal for a turbopump with multiple seals that form two purge cavities in which a non-reactive gas or liquid is delivered to prevent two liquids or gases from leaking through the seals and reacting, and where the purge gas or liquid is also used to react on a thrust piston secured to the rotor shaft to provide for an axial balance from other forces that act in an axial direction on the rotor shaft. The combination of a purge fluid for the inter-propellant seals along with using the purge fluid for the thrust balance reduces parts and complexity in the turbopump in order to reduce both size and weight in the turbopump for a rocket engine.

DETAILED DESCRIPTION OF THE INVENTION

Figure 1:
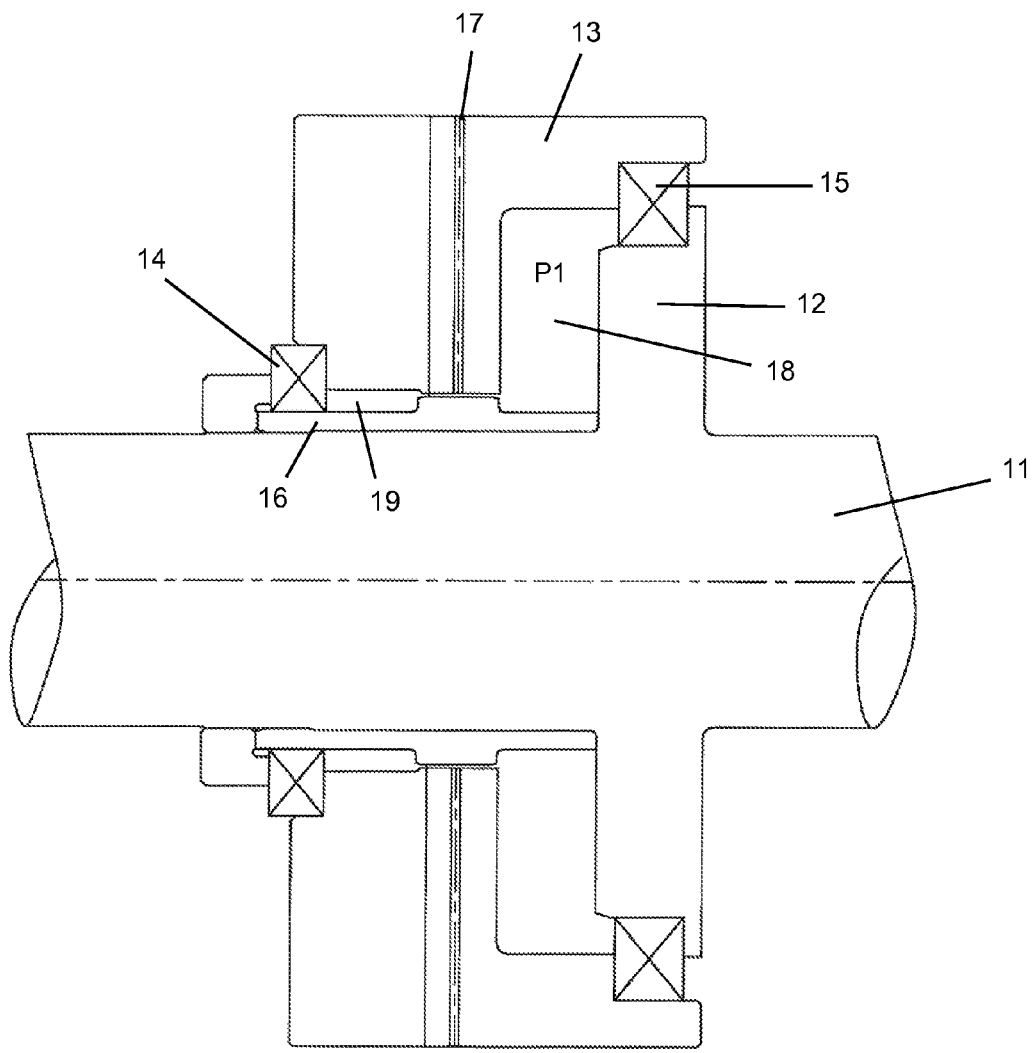
FIG. 1 shows a cross section view of an inter-propellant seal for a turbopump with a thrust seal of the present invention.

An inter-propellant thrust seal for a turbopump in a rocket engine is shown in FIG. 1 and includes a rotor shaft 11 with a thrust piston 12 rotatably secured to the rotor shaft 11. A stationary housing 13 includes support for a forward seal 14 and an aft seal 15. On the outside of the two seals 14 and 15 would be a fuel and an oxidizer that must not be allowed to leak passed the seals and react with one another. For example, a fuel could be outside the forward seal 14 and an oxidizer could be outside of the aft seal 15. A sleeve 16 supports the forward seal and forms a forward purge cavity 19. A thrust piston 12 supports the aft seal and forms an aft purge cavity 18.

To prevent leakages from the two reactive liquids or gases, a purge cavity is used and pressurized with a non-reactive fluid supplied through one or more purge fluid supply lines 17 into chambers 18 and 19. The pressure of the purge fluid must be higher than the pressures of both the fuel and the oxidizer to prevent either from leaking passed the respective seal and into the purge cavities 18 and 19. The purge fluid will leak past the seals 14 and 15 and prevent the reactive fluids from leaking across the seals.

An aft purge cavity 18 also forms a pressure chamber (P1) for the thrust piston 12. Because the aft purge cavity 18 is larger in cross sectional area than the forward purge cavity 19, the pressure of the purge fluid will act on the larger surface area of the thrust piston 12 and apply an axial force to the rotor shaft 11 for axial balance. The same purge fluid for the inter-propellant seal is used for the thrust piston 12. With this combination, the turbopump can be made lighter and with less parts. The size of the thrust piston 12 can be changed to accommodate any axial loads applied to the rotor shaft from such places as the turbine blades.

Figure 2:
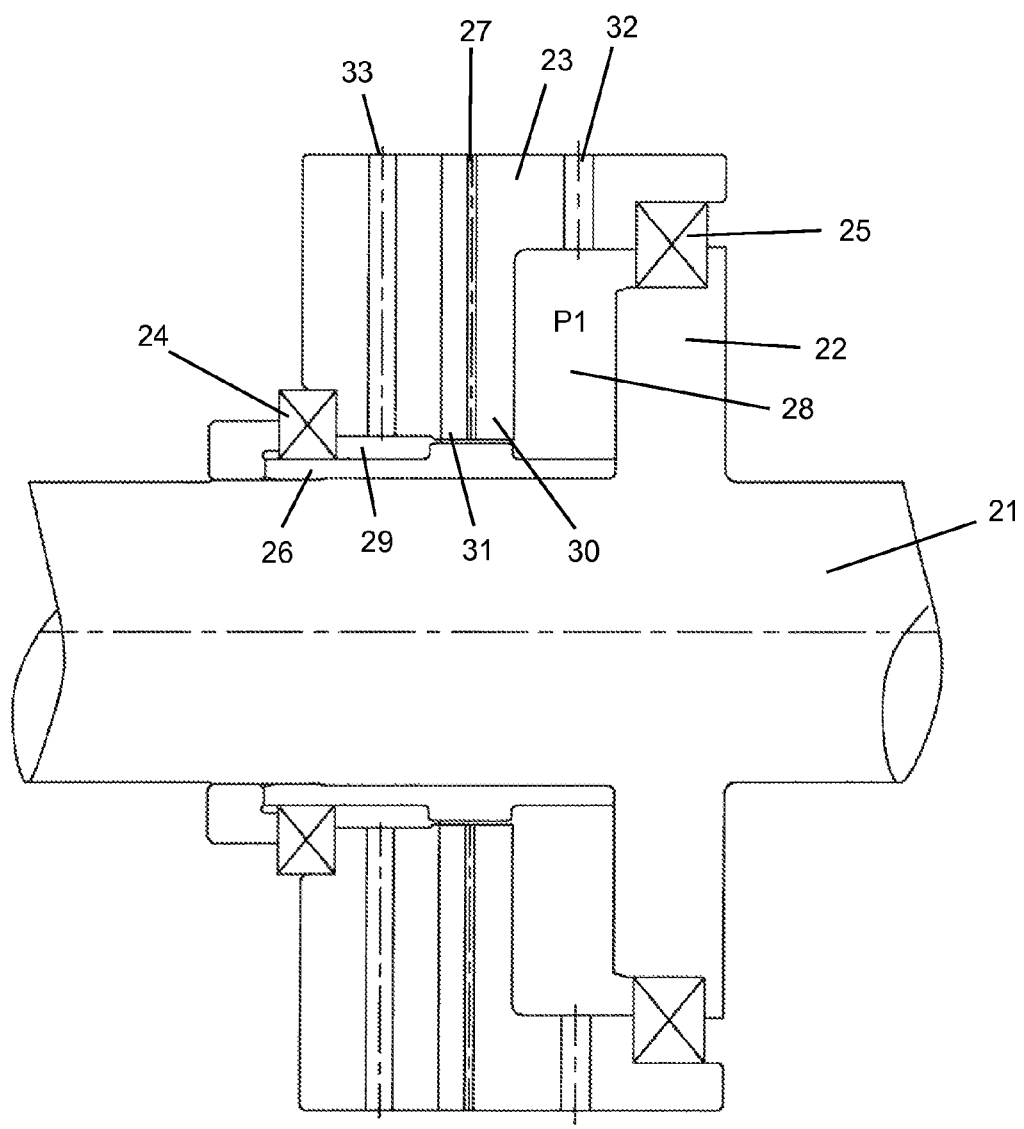
FIG. 2 shows a cross section view of a second embodiment of the inter-propellant seal in which two vent passages are connected to the two purge chambers.

A second embodiment of an inter-propellant thrust seal for a turbopump in a rocket engine is shown in FIG. 2 and includes a rotor shaft 21 with a thrust piston 22 rotatably secured to the rotor shaft 21. A stationary housing 23 includes support for two forward seals 24 and 31 and two aft seals 25 and 30. On the outside of the two seals 24 and 25 would be a fuel and an oxidizer that must not be allowed to leak passed the seals and react with one another. For example, a fuel could be outside the forward seal 24 and an oxidizer could be outside of the aft seal 25. A sleeve 26 supports the forward first seal 24 and forward second seal 31 (formed by a raised portion of the sleeve 26) forms a forward purge cavity 29. A thrust piston 22 supports the aft first seal 25 and with a second aft seal 30 forms an aft purge cavity 28.

To prevent leakages from the two reactive liquids or gases, the aft purge cavity 28 is used and vented through one or more aft vent passages 32 with a non-reactive fluid supplied through one or more purge fluid supply lines 27 into purge chambers 28 and 29. One or more forward vent passages 33 vents fluid from the forward purge cavity 29. The pressure of the purge cavities 28 and 29 must be lower than the pressures of both the fuel and the oxidizer and supply line 27 to prevent either from leaking passed the respective seals 24 and 25 or into the space between seals 30 and 31. The purge fluid will leak past seals 30 and 31 and prevent the reactive fluids from leaking across the seals.

An aft purge cavity 28 also forms a pressure chamber for the thrust piston 22. Because the aft purge cavity 28 is larger in cross sectional area than the forward purge cavity 29, the pressure of the purge fluid will act on the larger surface area of the thrust piston 22 and apply an axial force to the rotor shaft 21 for axial balance. The same purge fluid for the inter-propellant seal is used for the thrust piston 22. With this combination, the turbopump can be made lighter and with less parts. The size of the thrust piston can be changed to accommodate any axial loads applied to the rotor shaft from such places as the turbine blades.

In the FIG. 1 embodiment, a purge fluid is supplied through the radial purge fluid line 17 to flow across the two inner bearing surfaces and then into the two purge chambers 18 and 19 to push out any of the reactive fluids on the outsides of the two outer seals 14 and 15. The purge fluid will just mix with the two reactive fluids outside of the two outer bearings 14 and 15. in the FIG. 2 embodiment, the purge fluid and any leaking reactive fluid that passes across the two outer seals 14 and 15 will be collected in the two purge chambers 18 and 19 and vented out through the two vent passages 32 and 33. in both FIGS. 1 and 2, the purge fluid operating within the aft purge chamber 18 or 28 will produce an axial thrust on the axial thrust piston 12 or 22 and thus on the rotor shaft 11 or 21.

I claim the following:

1. An inter-propellant thrust seal for a rocket engine comprising:
    a stationary housing;
    a rotor shaft rotatably supported within the stationary housing;
    a forward first seal and a forward second seal forming a forward purge chamber between the stationary housing and the rotor shaft;
    an aft first seal and an aft second seal forming an aft purge chamber between the stationary housing and the rotor shaft;
    a purge fluid line extending through the stationary housing to provide a purge fluid to the forward and aft purge chambers through the forward second seal and the aft second seal;
    an axial thrust piston extending from the rotor shaft and forming a chamber wall of the aft purge chamber; and,
    a fluid reacting surface area of the aft purge chamber being larger than a fluid reaction surface area of the forward purge chamber such that the purge fluid pressure in the aft purge chamber produces an axial thrust on the rotor shaft.

2. The inter-propellant thrust seal of claim 1, and further comprising:
    a forward vent passage connected to the forward purge chamber and extending through the stationary housing to vent the forward purge chamber; and,
    an aft vent passage connected to the aft purge chamber and extending through the stationary housing to vent the aft purge chamber.

3. The inter-propellant thrust seal of claim 1, and further comprising:
    a sleeve secured on an outer surface of the rotor shaft, the sleeve having a projecting surface that forms the forward second bearing and the aft second bearing with the purge fluid line.

4. The inter-propellant thrust seal of claim 3, and further comprising:
    the sleeve forms a support for the forward first seal.

5. The inter-propellant thrust seal of claim 1, and further comprising:
    the axial thrust piston forms a support for the aft first bearing.

* * * * *